(No Model.)
J. E. EMERSON & T. MIDGLEY.
WIRE BELTING.
No. 362,576. Patented May 10, 1887.
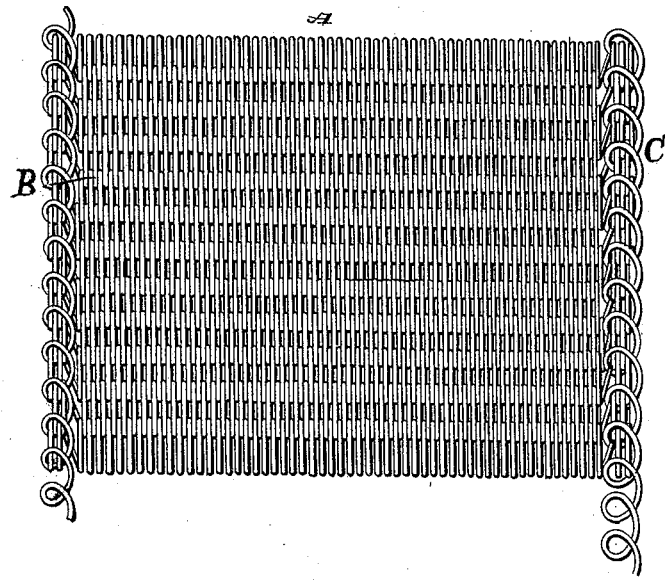

UNITED STATES PATENT OFFICE.

JAMES E. EMERSON AND THOMAS MIDGLEY, OF BEAVER FALLS, PA.

WIRE BELTING.

SPECIFICATION forming part of Letters Patent No. 362,576, dated May 10, 1887.

Application filed March 7, 1887. Serial No. 230,024. (No model.)

*To all whom it may concern:*

Be it known that we, JAMES E. EMERSON and THOMAS MIDGLEY, citizens of the United States, residing at Beaver Falls, in the county of Beaver and State of Pennsylvania, have invented certain new and useful Improvements in Wire Belting; and we do hereby declare the following to be a full, clear, and exact description of the invention, such as will enable others skilled in the art to which it appertains to make and use the same.

The invention relates to wire belting, and has for its object the production of a belt of superior quality which will not stretch when subjected to the ordinary strain attending the use of belts for the various purposes to which they are generally applied.

The invention will be hereinafter described, and particularly pointed out in the claims.

The accompanying drawing represents a plan view of our improved belting.

Reference being had to the drawing and the letters marked thereon, A represents a belt made of transverse sections of wire B, which are woven together by screwing the sections into each other throughout the length of a belt, and longitudinal sections C, which intersect the ends of the transverse sections B.

The sections C form the edge of the belt, protect the ends of the sections B, and form a bearing-surface for working contact with a shipper.

The sections B and C having been woven together to form a sheet, they are passed through suitable rolls for flattening the links, and the end or longitudinal sections are mashed down upon one or both sides of the belt.

In rolling the sheet or belt the material is kept under tension longitudinally, in order to bring the links into bearing contact with each other, to prevent stretching of the belt when in use, and to distribute the strain or wear evenly across the entire belt.

The belt may be used in any and all places where belts are generally used, and may be coated with or embedded in rubber, canvas, or other material. The ends of the belt may be secured together by screwing a spiral section (such as B) into them, or by means ordinarily employed for the purpose of joining belts.

Heretofore it has been proposed to make wire belting with oval spirals, the links being connected together by pushing the turns or twists of one link between the turns or twists of the adjacent links, and then passing a rod transversely through all of the links of both sections and bending the rod to hold them together. Wire-netting has also been made by intersecting spiral sections of wire, separating the sections and inserting a transverse rod upon which the bearings of all the links are formed. We are not aware, however, that rolled-wire belting has ever been in use prior to our invention.

In another application filed herewith, Serial No. 230,025, we have claimed the method involved in making our improved wire belting.

Having thus fully described our invention, what we claim is—

1. Wire belting consisting of transverse sections of interwoven wire, the links of one section engaging with the links of the adjacent sections, and the ends of said sections secured by continuous independent longitudinal sections of coiled wire, substantially as described.

2. Wire belting consisting of transverse sections of interwoven wire, the links of one section intersecting with and bearing upon the links of the adjacent sections, and continuous independent longitudinal sections of coiled wire engaging with the ends of the transverse sections to form the edges of a belt, the whole being rolled or flattened, substantially as described.

In testimony whereof we affix our signatures in presence of two witnesses.

JAMES E. EMERSON.
THOMAS MIDGLEY.

Witnesses as to J. E. Emerson:
  I. A. TERRY,
  WM. E. DYRE.

Witnesses as to T. Midgley:
  GEO. W. MORRISON,
  J. F. MERRIMAN.